United States Patent

Micheli

[15] 3,637,505

[45] Jan. 25, 1972

[54] METHOD OF PREPARING A LITHIUM-CONTAINING FERRITE COMPOSITION

[72] Inventor: Adolph L. Micheli, Royal Oak, Mich.
[73] Assignee: General Motors Corporation, Detroit, Mich.
[22] Filed: June 16, 1969
[21] Appl. No.: 833,448

[52] U.S. Cl. .................................................. 252/62.61
[51] Int. Cl. ......................................................... C04b 35/26
[58] Field of Search ......................... 252/62.61, 62.56, 62.63; 23/51

[56] References Cited

UNITED STATES PATENTS 3,019,189  1/1962  Albers-Schoenberg ............. 252/62.63
3,049,404  8/1962  Wade ................................. 252/62.63

FOREIGN PATENTS OR APPLICATIONS 869,554   5/1961   Great Britain ..................... 252/62.56
1,009,661 12/1952  France .............................. 252/62.56

Primary Examiner—Robert D. Edmonds
Attorney—William S. Pettigrew and George A. Grove

[57] ABSTRACT

Finely divided particles of lithium ferrites are prepared by coprecipitating from aqueous solution a suitable fatty acid salt of lithium (such as, preferably, lithium laurate or lithium stearate) with ferric hydroxide and, when desired, hydroxides of other metals. The finely divided precipitated particles comprising an intimate mixture of ferrite precursor materials are heated to burn out the organic fatty acid material and yield a residue of uniformly mixed metal oxides, which oxides are subsequently calcined to form a desired ferrite.

4 Claims, 1 Drawing Figure

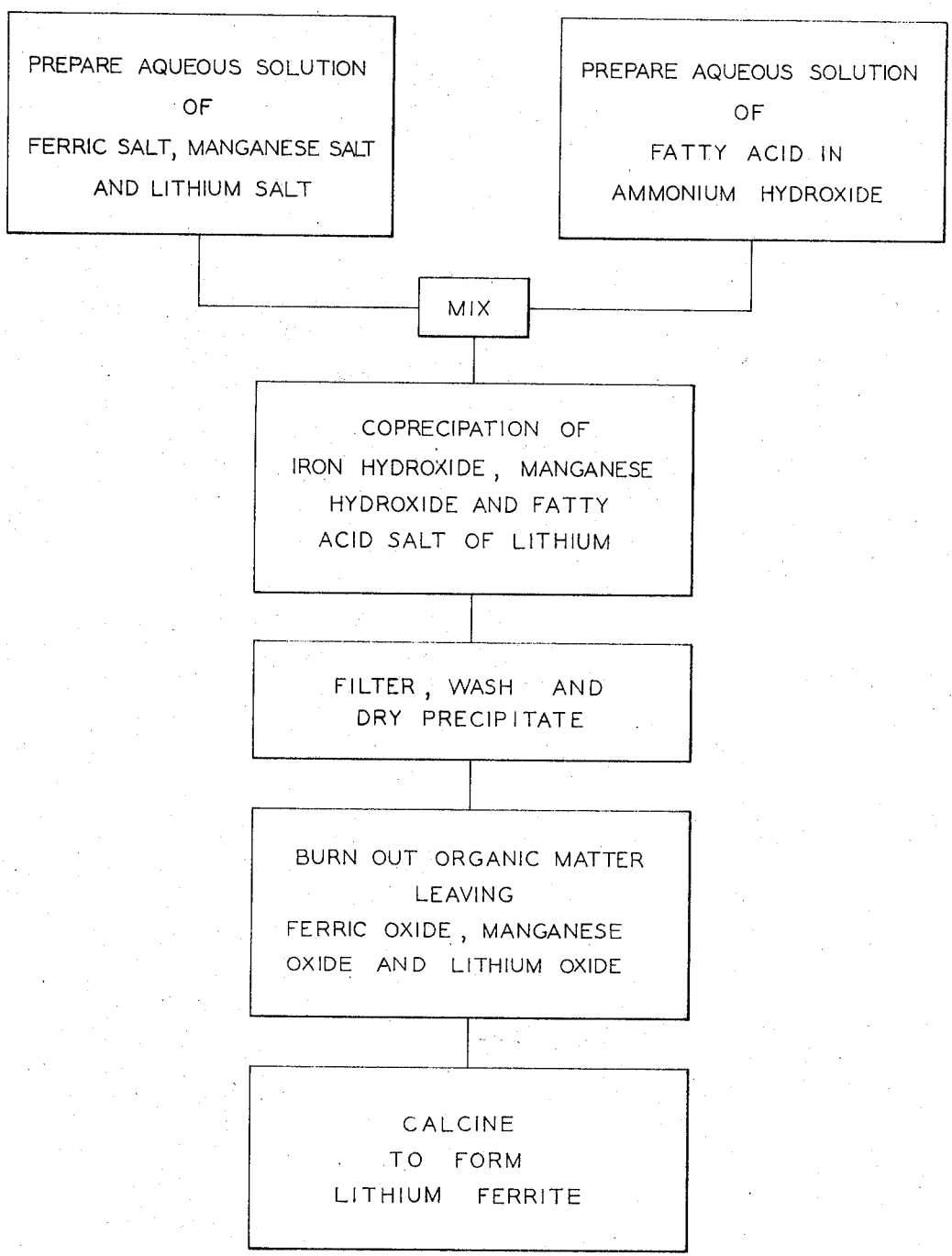

METHOD OF PREPARING A LITHIUM-CONTAINING FERRITE COMPOSITION

This invention relates to the preparation of lithium-containing ferrite compositions. More particularly this invention relates to a coprecipitation process wherein finely divided particles of intimately mixed lithium stearate (or like fatty acid salt) and ferric hydroxide are formed. These particles may be calcined to form a lithium ferrite and processed into useful magnetic articles such as computer memory cores.

A number of lithium ferrite compositions comprising the oxides of lithium and iron, and when desired the oxides of other metals such as manganese, nickel and zinc, are known to be useful in applications requiring soft ferrimagnetic properties. The lithium ferrites can be prepared by known techniques to have magnetic properties particularly suitable for electronic devices such as computer memory cores, switches, counters and the like. Lithium ferrites are usually synthesized and have been prepared by mixing and milling together powder mixtures of lithium carbonate, iron oxide and the oxides of other suitable metals. After prolonged milling the powder mixture is calcined at an elevated temperature of, for example, 1,000° C. to coreact the individual oxides into the spinel lithium ferrite which may then be further processed into a desired electronic component. However, ferrite powders prepared by the above-described ceramic technique typically have grain sizes of 5 to 10 microns. The switching speed of computer memory cores is inversely proportional to the grain size of the lithium ferrite constituents, and therefore it is now desired to produce lithium ferrites of substantially smaller grain size for use in memory cores of high speed electronic computing devices. However, prior art lithium ferrite preparation techniques are not suitable for preparing chemically uniform lithium ferrites of extremely small grain size.

It is an object of the present invention to provide a coprecipitation technique for producing a mixture of suitable compounds of lithium, iron and, if desired, other suitable metals, for conversion to lithium ferrites wherein the grain size of ferrite particles is less than 1 micron thereby permitting a substantial decrease in the switching time of lithium ferrite memory cores.

It is a further object of the present invention to provide a coprecipitation process wherein an aqueous solution of suitable salts of iron, lithium, manganese and other desired metals is mixed with a precipitating agent which will cause the precipitation of a fatty acid salt of lithium with the hydroxides of the other metals present in the solution. The precipitate represents a substantially uniform mixture of precursor compounds of the ferrite metals. In addition, the precipitate is in finely divided form so that subsequent heating operations in connection with ferrite manufacture will yield a fine grain ferrite particularly suitable for fast switching in computer memory cores.

In accordance with a preferred embodiment of my invention, these and other objects are accomplished by providing a first aqueous solution of suitable salts of iron, lithium and any other desired components of a lithium-containing ferrite, such as manganese. The sulfate salts of lithium, iron and manganese are preferred for this purpose. A second aqueous solution of ammonium hydroxide and the ammonium salt of a fatty acid such as lauric acid or stearic acid is prepared, the fatty acid preferably having at least 10, and up to about 20 carbon atoms in its molecule. The solution of metal salts is mixed with the fatty acid-ammonium hydroxide solution to form a finely divided precipitate comprising the fatty acid salt of lithium and the hydroxides of iron and any other metals present in a uniform mixture. The precipitate is filtered from the mother liquor and dried. The dry precipitate is heated in air at a modest elevated temperature, preferably about 200° C., to dehydrate the precipitate and to burn out carbonaceous matter leaving a residue of the oxides of the respective metals. The particles are then heated at a temperature of 400° to 500° C. to coreact the lithium oxide, ferric oxide and any other metal oxides present to form a spinel lithium-containing ferrite. At this stage the ferrite particles, which are extremely small in size—about 100 angstroms—are formed by any suitable method into toroidal memory cores, or other electronic components, and are sintered at temperatures of about 1,100° C. The sintering operation results in some grain growth, although such growth is advantageously inhibited by the presence of a small amount of calcium, so that an ultimate grain size of about 1 to 2 microns is obtained. It will be noted that this is significantly smaller than the grain sizes of 5 to 10 microns obtained in connection with conventionally prepared lithium ferrite powders. The smaller lithium ferrite grains obtained by my method permit the manufacture of memory cores having a substantially shorter switching time.

Other objects and advantages of my invention will become more clear in view of the detailed description which follows. Reference may be had to the attached drawing which is a flow diagram of one preferred embodiment of the process.

A number of known useful lithium ferrite compositions are described in detail in the Baltzer patent, U.S. Pat. No. 3,034,987 and the Lindquist, et al. patent, U.S. Pat. No. 3,425,666. For purposes of an example illustrating the practice of my invention I will describe a method of preparing the mixed spinel ferrite having the empirical molar composition $Li_{0.48}Mn_{0.32}Fe_{2.20}O_4$.

An aqueous solution was prepared containing 9.34 grams $Li_2SO_4 \cdot 2O$, 16.44 grams $MnSO_4 \cdot H_2O$, and 174.20 grams $Fe_2(SO_4)_3 \cdot n\ H_2O$ (assaying 76.8% $Fe_2(SO_4)_3$) dissolved in 1,500 milliliter of water. To this solution was also added 1.64 grams $Ca(NO_3)_2 \cdot H_2O$. The calcium was added to retard the grain growth in a subsequent operation, as indicated above, and does not otherwise constitute part of the ferrite. A second aqueous solution comprising ammonium hydroxide and ammonium stearate was prepared. This was accomplished by adding 125 grams ammonium hydroxide and 40.5 grams stearic acid to 2,000 milliliters of water. In accordance with my invention an amount of stearic acid, or other suitable fatty acid, is employed which is chemically equivalent to the amount of lithium which is to be precipitated. The ammonium hydroxide is employed to precipitate all of the other metals and to maintain the pH of mixture at a level suitable for complete precipitation of all of the metals required in the ferrite. The aqueous solution of the metal sulfates was slowly added to the ammonium hydroxide-ammonium stearate solution while stirring until the pH of the precipitation mixture dropped to 9.5. A finely divided precipitate immediately formed. It is preferred not to conduct the precipitation at pH values below 8.0 to avoid redissolving the lithium. The precipitate was filtered, washed with water and was then dried overnight. Under the conditions of the precipitation by my method lithium was precipitated as its stearate salt while the iron, manganese and calcium were precipitated as their respective hydroxides, the iron being in its ferric form. The dried precipitate particles were heated in air at 200° C. to dehydrate the hydroxides and burn out the stearate leaving a residue of lithium oxide, ferric oxide, manganese oxide and calcium oxide in intimate mixture. The powdered metal oxide was then heated at 400° C. for 1 hour to coreact the respective oxides (with the exception of calcium oxide) to form the spinel lithium-manganese ferrite. The calcium oxide does not combine with the other metal oxides but is precipitated at the grain boundaries to serve as a grain growth inhibitor, as is known, during any subsequent heat treatment of the lithium ferrite. At this stage my coprecipitated lithium ferrite particles uniformly had a maximum dimension of the order of 100 angstroms. Lithium ferrites prepared by conventional techniques have a particle size of 1 to 2 microns. It will be appreciated that my coprecipitated lithium ferrites can be processed into useful electronic components involving further heating and still have a smaller ultimate grain size than conventional lithium ferrites.

For purposes of illustrating the utility of my finely divided, chemically uniform lithium ferrites, a quantity of the coprecipitated ferrites were pressed into 30 mil toroidal shaped memory cores. The green cores were sintered at 1,095° C. for 6 hours, cooled in air, refired to 900° C., and quenched in air in accordance with conventional lithium ferrite processing. The lithium ferrite grain size in the cores was determined to be 1 or 2 microns at the completion of the core manufacturing operation.

The ferrite cores were then subjected to test drive current pulses, the time characteristics of the core output signals being evaluated in accordance with standard techniques. The peak time ($T_p$) for the output signal of the cores was found to be 0.190 microseconds and the switching time ($T_s$) was found to be 0.310 microseconds when a drive current ($I_f$) of 1,200 milliamperes and a partial write current ($I_{pw}$) of 720 milliamperes was employed. The rise times ($T_r$) of the current pulses were 0.100 microseconds. This switching time is very fast for 30-mil lithium ferrite cores as will be shown and represents a significant and useful improvement in the art.

For purposes of comparison commercial lithium ferrite powder of composition identical to that prepared in accordance with the above example was obtained. This powder was pressed into 30-mil computer storage cores and the green cores were sintered in accordance with the heat treatment specified above. The grain size of the lithium ferrite was then 5 to 10 microns. These cores were also subjected to test drive current pulses and the time characteristics of the core output signals evaluated. The peak time ($T_p$) of these cores was 0.200 microseconds and the switching time ($T_s$) was found to be 0.370 microseconds when a drive current ($I_f$) of 1,000 milliamperes and a partial write current ($I_{pw}$) of 600 milliamperes was employed. While computer cores formed from the very small lithium ferrite particles produced by my method tend to require a greater drive current than do the conventionally prepared ferrites, it is noted that a substantially faster switching time is achieved. The required drive current can, of course, be reduced by forming a smaller toroid, but the switching time is inherent in the ferrite itself. Lithium ferrites produced by my method are inherently faster switching than conventionally produced ferrites of like composition, because the former materials are produced with a smaller grain size.

In general, by my coprecipitation process any of a number of lithium-containing ferrite compositions may be prepared having uniform composition and extremely fine particle size. In addition to manganese, small amounts of nickel and zinc, for example, may also be coprecipitated with the lithium and iron. All of these metals typically employed in lithium-containing soft ferrites are precipitated as their respective hydroxides. However, the lithium is precipitated as its fatty acid salt, preferably as lithium stearate or laurate. It is also preferred that the precipitation be made using ammonium hydroxide so that the final ferrite material is not contaminated with extraneous metals such as sodium or potassium which could be incorporated if sodium hydroxide or potassium hydroxide were employed. Since it is well known that nickel and zinc form water soluble complexes with ammonium hydroxide ($NH_4OH$), tetramethyl ammonium hydroxide ($(CH_3)_4NOH$) is preferably substituted for ammonium hydroxide if these metals are to be coprecipitated with the other ferrite components.

The precipitating solution comprising ammonium hydroxide (or tetramethyl ammonium hydroxide) and the ammonium salt of a suitable fatty acid should be prepared so that the proportion of fatty acid salt is just sufficient to precipitate the lithium, the other metals being precipitated as the respective hydroxides. When an attempt is made to precipitate all the metallic components in the ferrite as their fatty acid salts, a soaplike mass is obtained which upon burnout of the organic material fuses and fails to produce suitably fine particles.

As noted above, the precipitation of the lithium containing ferrite precursor mixture is conducted in accordance with my method at a pH above 8.0 to avoid successive loss of lithium due to its solubility in less basic aqueous environments. If the precipitation is conducted at a pH substantially below 8.0 additional lithium should be added initially to compensate for that result.

Long chain saturated or unsaturated fatty acids containing preferably 10 to 20 carbon atoms are employed to coprecipitate lithium in the ferrite precursor mixture. I consider it desirable to employ a fatty acid of at least 10 carbon atoms to assure substantially complete precipitation of lithium from the aqueous medium at a suitable pH value. Fatty acids containing more than 20 carbon atoms add little to the completeness of the precipitation, and may themselves be difficult to dissolve in ammonium hydroxide or tetramethyl ammonium hydroxide. Lauric acid and stearic acid are examples of readily available, substantially pure fatty acids which are suitable for use in my process.

My coprecipitated ferrite particles have an extremely small particle size of the order of 100 angstroms and therefore have a tendency to grow rapidly when heated. To take advantage of the potential properties of these coprecipitated powders it is preferred that a small amount, up to about 2 percent by weight of the ferrite of calcium be incorporated therein. It does not appear that the calcium becomes part of the spinel ferrite crystal but merely forms at the grain boundaries and sufficiently inhibits grain growth so that magnetic components of fine particle size may be produced. It is already known that calcium will function in this way with respect to lithium ferrite compositions and the use of calcium is particularly beneficial in ferrites prepared in accordance with my method.

While my invention has been described in the terms of a few specific embodiments thereof it will be appreciated that there are other forms which could be readily adapted by one skilled in the art and therefore the scope of my invention should be considered limited only by the following claims.

1. A method of forming a lithium-containing magnetic ferrite composition comprising coprecipitating ferric hydroxide and an organic fatty acid salt of lithium from an aqueous solution of an ammonium hydroxide and a fatty acid as finely divided particles wherein said ferric hydroxide and said fatty acid salt of lithium are intimately mixed, said fatty acid containing at least 10 carbon atoms in its molecule,
   separating the precipitated particles from the aqueous mother liquor,
   drying said particles,
   heating said particles at a first elevated temperature suitable to burn out the fatty acid organic material from said particles leaving a residue comprising an intimate mixture of ferric oxide and lithium oxide,
   and further heating said particles at a second elevated temperature higher than said first temperature suitable to coreact said oxides to form a particulate crystalline ferrite composition comprising iron, lithium and oxygen.

2. A method of forming a lithium-containing ferrite composition comprising preparing a first aqueous solution comprising suitable water soluble salts or iron and lithium,
   preparing a second solution comprising a fatty acid containing from 10 to 20 carbon atoms in its molecule in aqueous ammonium hydroxide,
   mixing said first and said second solutions to coprecipitate iron ferric hydroxide with the fatty acid salt of lithium to form a finely divided precipitate wherein said iron ferric hydroxide and said fatty acid salt of lithium are intimately mixed,
   filtering said precipitate from the mother liquor,
   drying the precipitate,
   burning out the fatty acid organic material from said particles at a temperature suitable to leave a residue comprising an intimate mixture of ferric oxide and lithium oxide,
   and calcining said particles at a temperature suitable to form a crystalline ferrite composition comprising iron, lithium and oxygen.

3. A method of forming a lithium-containing ferrite composition comprising preparing a first aqueous solution comprising suitable water soluble salts of ferric iron and lithium,
   preparing a second solution comprising a fatty acid containing from 10 to 20 carbon atoms in its molecule in aqueous ammonium hydroxide,
   mixing said first and said second solutions to coprecipitate ferric hydroxide with the fatty acid salt of lithium to form a finely divided precipitate wherein said ferric hydroxide and said fatty acid salt of lithium are intimately mixed, filtering said precipitate from the mother liquor, drying the precipitate, heating said particles at a first elevated temperature of the order of 200° C. suitable to burn out the fatty acid organic material leaving a residue comprising an intimate mixture of ferric oxide and lithium oxide, and further heating said particles at a second elevated temperature higher than said first elevated temperature of the order of 400° to 500° C. suitable to coreact said oxides to form a particulate crystalline ferrite composition comprising iron, lithium and oxygen and having a grain size of about 100 angstroms.

4. A method of forming lithium-containing magnetic ferrite composition comprising preparing a first aqueous solution comprising suitable water soluble salts of ferric iron, lithium and manganese, preparing a second solution comprising an organic fatty acid containing from 10 to 20 carbon atoms in its molecule in aqueous ammonium hydroxide, mixing said first and said second aqueous solutions to coprecipitate ferric hydroxide, manganese hydroxide and said fatty acid salt of lithium as finely divided particles wherein said ferric hydroxide, manganese hydroxide and fatty acid salt of lithium are intimately mixed, filtering said precipitate from the mother liquor, drying the precipitate, burning out the fatty acid organic material from said particles at a temperature suitable to leave a residue comprising an intimate mixture of ferric oxide and lithium oxide, and calcining said particles at a temperature suitable to form a crystalline ferrite composition comprising iron, lithium, manganese and oxygen.

* * * * *

PO-1050
(5/69)

UNITED STATES PATENT OFFICE
CERTIFICATE OF CORRECTION

Patent No. __3,637,505__  Dated __January 25, 1972__

Inventor(s) __Adolph L. Micheli__

It is certified that error appears in the above-identified patent and that said Letters Patent are hereby corrected as shown below:

Column 2, line 25, "$Li_2SO_4 \cdot 2O$" should read -- $Li_2SO_4 \cdot H_2O$ --. Column 3, line 3, "1 or 2" should read -- 1 to 2 --. Column 4, line 49, "or" should read -- of --; line 54, delete "iron", line 55, delete "iron".

Signed and sealed this 22nd day of August 1972.

(SEAL)
Attest:

EDWARD M. FLETCHER, JR.
Attesting Officer

ROBERT GOTTSCHALK
Commissioner of Patents